United States Patent
Burns et al.

(10) Patent No.: US 10,903,029 B2
(45) Date of Patent: Jan. 26, 2021

(54) CIRCUIT BREAKER INERLOCK FOR ARC QUENCHING DEVICE

(71) Applicant: Eaton Intelligent Power Limited, Dublin (IE)

(72) Inventors: Robert Judson Burns, Hendersonville, NC (US); David Aaron Metcalf, Black Mountain, NC (US)

(73) Assignee: Eaton Intelligent Power Limited

( * ) Notice: Subject to any disclaimer, the term of this patent is extended or adjusted under 35 U.S.C. 154(b) by 0 days.

(21) Appl. No.: 16/376,826

(22) Filed: Apr. 5, 2019

(65) Prior Publication Data

US 2020/0321173 A1    Oct. 8, 2020

(51) Int. Cl.
*H01H 33/12* (2006.01)
*H01H 71/12* (2006.01)

(52) U.S. Cl.
CPC ............ *H01H 33/12* (2013.01); *H01H 71/12* (2013.01)

(58) Field of Classification Search
CPC ............ H01H 9/20; H01H 9/223; H01H 9/24; H01H 2009/265; H01H 33/12; H01H 33/46; H01H 71/12; H01H 21/22; H01H 33/32; H01H 9/22; H01H 75/04; H02B 11/127; H02B 11/26; H02B 11/133

USPC .......... 218/146, 75, 76, 103, 134, 139, 155; 200/50.17, 50.21, 50.39, 50.38
See application file for complete search history.

(56) References Cited

U.S. PATENT DOCUMENTS

| | | | | |
|---|---|---|---|---|
| 2,889,421 A | * | 6/1959 | Townsend | H01H 9/20 200/50.32 |
| 4,412,112 A | * | 10/1983 | Ishikawa | H02B 11/127 200/50.21 |
| 6,486,421 B1 | * | 11/2002 | Jones | H01H 9/26 200/50.32 |
| 6,724,604 B2 | | 4/2004 | Shea et al. | |
| 7,019,229 B1 | * | 3/2006 | Weister | H01H 9/22 200/50.01 |
| 7,064,283 B2 | * | 6/2006 | Deylitz | H02B 11/133 200/50.21 |
| 8,822,866 B2 | * | 9/2014 | Fasano | H01H 9/36 218/154 |
| 9,025,299 B2 | | 5/2015 | Shea et al. | |
| 9,679,722 B2 | * | 6/2017 | Mun | H01H 33/66 |
| 9,735,555 B2 | * | 8/2017 | Fishovitz | H02B 1/066 |

* cited by examiner

*Primary Examiner* — William A Bolton
(74) *Attorney, Agent, or Firm* — Stanek Lemon Crouse & Meeks, P.A.

(57) ABSTRACT

An arc quenching device creates a fault on a bus. A lockout mechanism of a circuit breaker feeding the bus is responsively actuated. Actuating the lockout mechanism may include releasing a spring-loaded mechanism mounted on a cassette that holds the circuit breaker to cause the mechanism to engage a lockout member of the circuit breaker.

19 Claims, 9 Drawing Sheets

CIRCUIT BREAKER INERLOCK FOR ARC QUENCHING DEVICE

BACKGROUND

The inventive subject matter relates to electrical power apparatus and methods and, more particularly, to circuit, protection apparatus for electrical power systems.

Arc faults may be caused by a variety of different events, including inadvertent dropping of metal tools on energized components, misalignment of switch contacts, failure of connections, and failed cable or bus insulation. In medium voltage electrical equipment, such as medium voltage switchgear and motor drives, arc faults can produce arc flashes with sufficient energy to kill or injure personnel and significantly damage equipment.

Several techniques have been developed to mitigate the effects of arc faults. For example, switchgear enclosures may be designed to contain and/or channel arc flash heat and, gases to reduce or minimize, exposure to personnel. Switchgear and similar equipment may also be equipped with active devices that may reduce arc flash energy. For example, U.S. Pat. No. 6,724,604 to Shea et al. and U.S. Pat. No. 9,025,299 to Shea et al. describe arc fault mitigation devices that detect arc faults and responsively create a compensatory contained fault that serves to reduce energy in the original fault and mere quickly clear upstream circuit breakers, thus potentially reducing the likelihood and severity of personnel injury and equipment damage.

SUMMARY

Some embodiments of the inventive subject matter provide a system including a circuit breaker coupled to a bus and having a lockout mechanism configured to prevent closing of the circuit breaker to feed energy to the bus. The system further includes an arc quenching device coupled to the bus and an interlock device configured to actuate the lockout mechanism of the circuit breaker responsive to the arc quenching, device. The arc quenching device may be configured to generate a fault on the bus, and the interlock device may be configured to prevent closing of the circuit breaker into the fault.

In some embodiments, the circuit breaker is supported by a drawout cassette and the interlock device may be mounted on the cassette. The interlock device may include a spring-loaded mechanism mounted on the cassette and configured to engage a lockout member of the circuit breaker. The interlock device may further include an actuator configured to release the spring-loaded mechanism to cause the spring-loaded mechanism to move the lockout member.

In further embodiments, the spring-loaded mechanism may include a lockout engagement member disposed on a first side of a sidewall of the cassette and configured to engage the lockout member, a shaft mechanically coupled to the lockout engagement member, a drive latch attached to the shaft on a second side of the sidewall and configured to rotate with the shaft, a drive spring attached to the drive latch, and a lock latch configured to engage the drive latch to prevent movement thereof. The actuator may be configured to move the lock latch to release the drive latch to rotate under a force applied by the drive spring. According to further aspects, the arc quenching device may include a set of auxiliary contacts and the actuator may include a solenoid electrically coupled to a power source via the set of auxiliary contacts.

Further embodiments of the inventive subject matter provide an interlock device including a spring-loaded mechanism configured engage a lockout member of a circuit breaker and an actuator configured to release the spring-loaded mechanism responsive to operation of an arc quenching device to cause the spring-loaded mechanism to move the lockout member. The spring-loaded mechanism may be configured to be mounted on a drawout cassette that holds the circuit breaker. The spring-loaded mechanism may include a lockout engagement member disposed on a first side of a sidewall of the cassette and configured to engage the lockout member, a shaft mechanically coupled to the lockout engagement member, a drive latch attached to the shaft on a second side of the sidewall and configured to rotate with the shaft, a drive spring attached to the drive latch, and a lock latch configured to engage the drive latch to prevent movement thereof. The actuator may be configured to move, the lock latch to release the drive latch to rotate under a force applied by the drive spring. The actuator may include a solenoid configured to be electrically coupled to a power source via a set of auxiliary contacts of the arc quenching device.

Still further embodiments provide methods including creating a fault on a bus using an arc quenching device and responsively actuating a lockout mechanism of a circuit breaker feeding the bus. Actuating the lockout mechanism may include releasing a spring-loaded mechanism mounted on a cassette that holds the circuit breaker to cause the mechanism to engage a lockout member of the circuit breaker. Releasing the spring-loaded mechanism may include driving an actuator that releases the spring-loaded mechanism responsive to operation of a set of contacts controlled by the arc quenching device.

DETAILED DESCRIPTION

Specific exemplary embodiments of the inventive subject matter now will, be described with reference to the accompanying drawings. This inventive subject matter may, however, be embodied in many different forms and should not be construed as limited to the embodiments set forth herein;

rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 1:
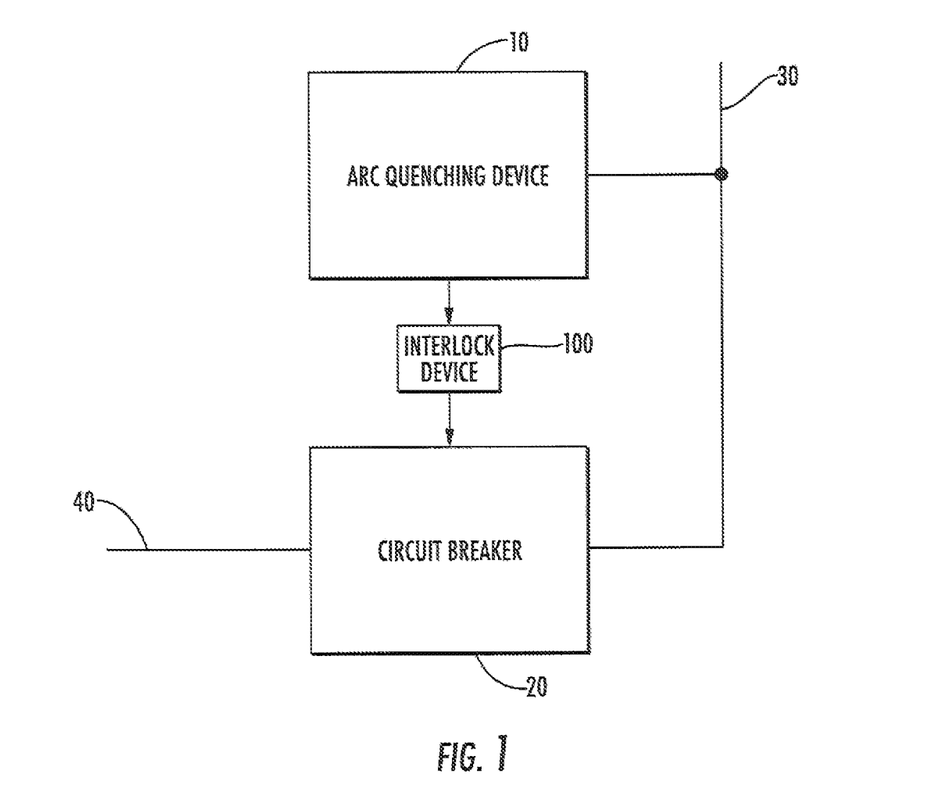
FIG. 1 is a schematic diagram of a system according to some embodiments of the inventive subject matter.

FIG. 1 illustrates a system according to some embodiments of the inventive subject matter. The system includes an arc quenching device 10, which is connected to, a first bus 30. The first bus 30 is fed by a circuit breaker 20 that has its input connected to a second bus 40 (e.g., a utility power feed). When the arc quenching device 10 operates in response to an arc fault, the circuit breaker 20 opens due to the fault created by the arc quenching device 10, thus disconnecting the first bus 30 from the second bus 40. Embodiments of the inventive subject matter arises from a realization that closing the circuit breaker 20 after operation of the arc quenching device 10 might result in result in energizing into a hard fault created by the arc quenching device 10, which could result in injury and/or catastrophic damage. According to some embodiments, the system further includes an interlock device 100 that prevents the circuit breaker 20 from, closing after operation of the arc quenching device 10.

Figure 2:
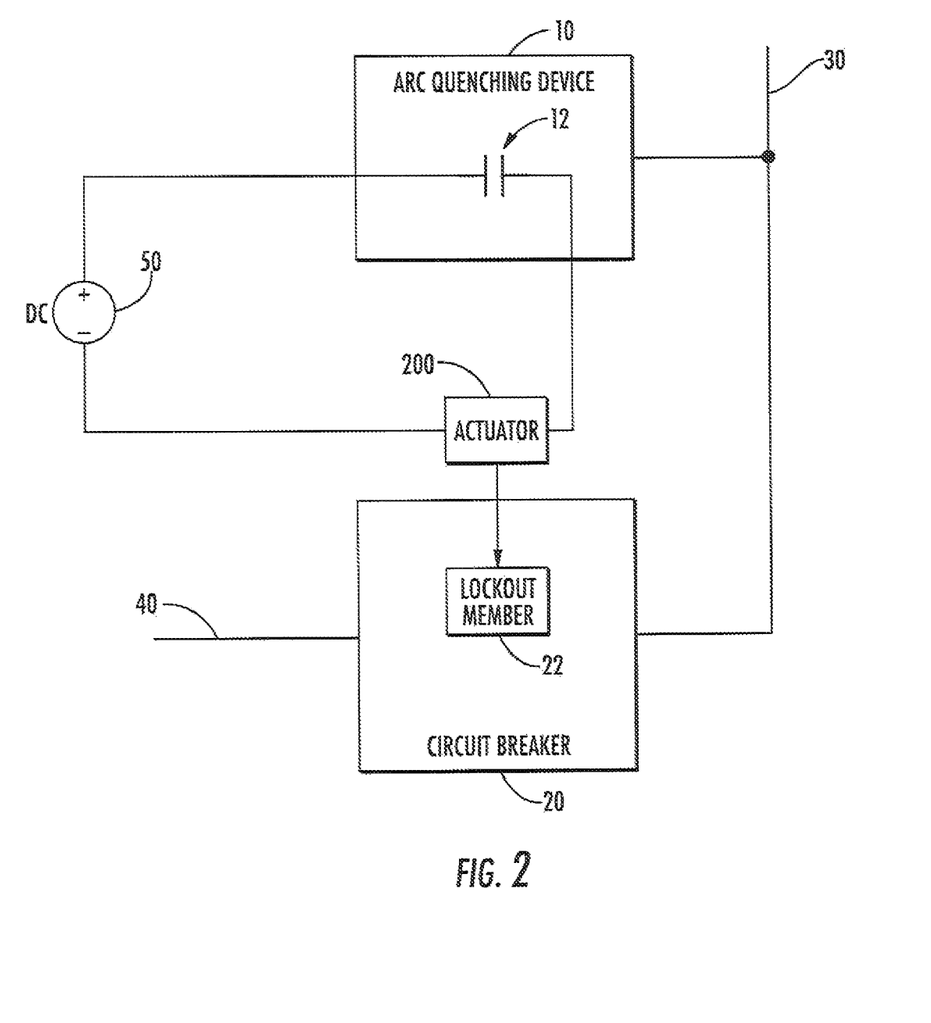
FIG. 2 is a schematic diagram illustrating a system according to further embodiments of the inventive subject matter.
Figure 6:
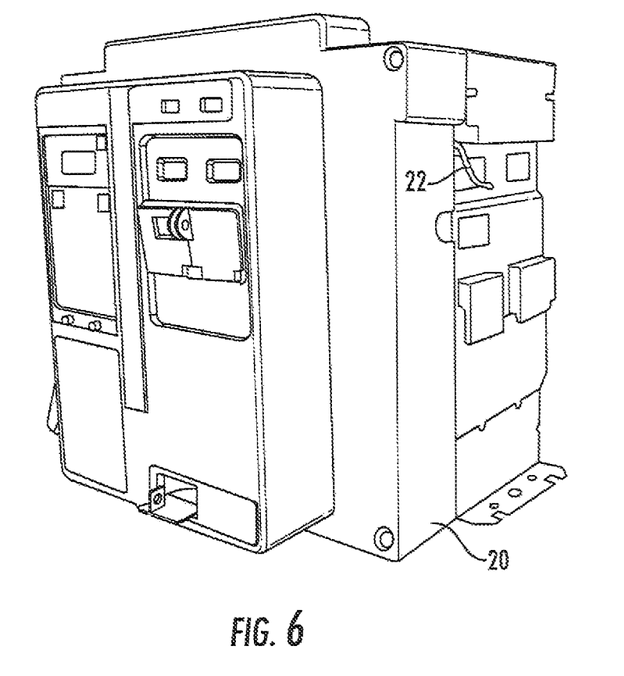
FIG. 6 is a perspective view of a circuit breaker with a lockout member.
Figure 7:
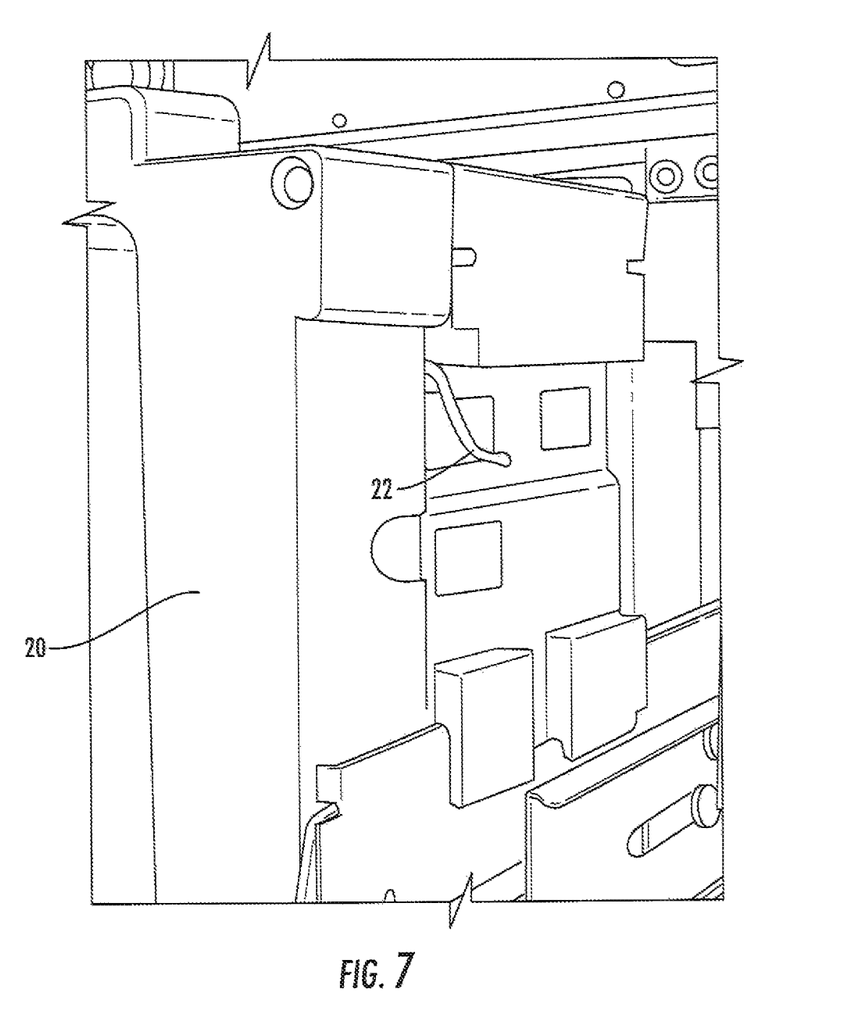
FIG. 7 is a perspective view of the circuit breaker of FIG. 6 installed in a cassette in an extracted state and illustrating the lockout member of the circuit breaker in detail.
Figure 8:
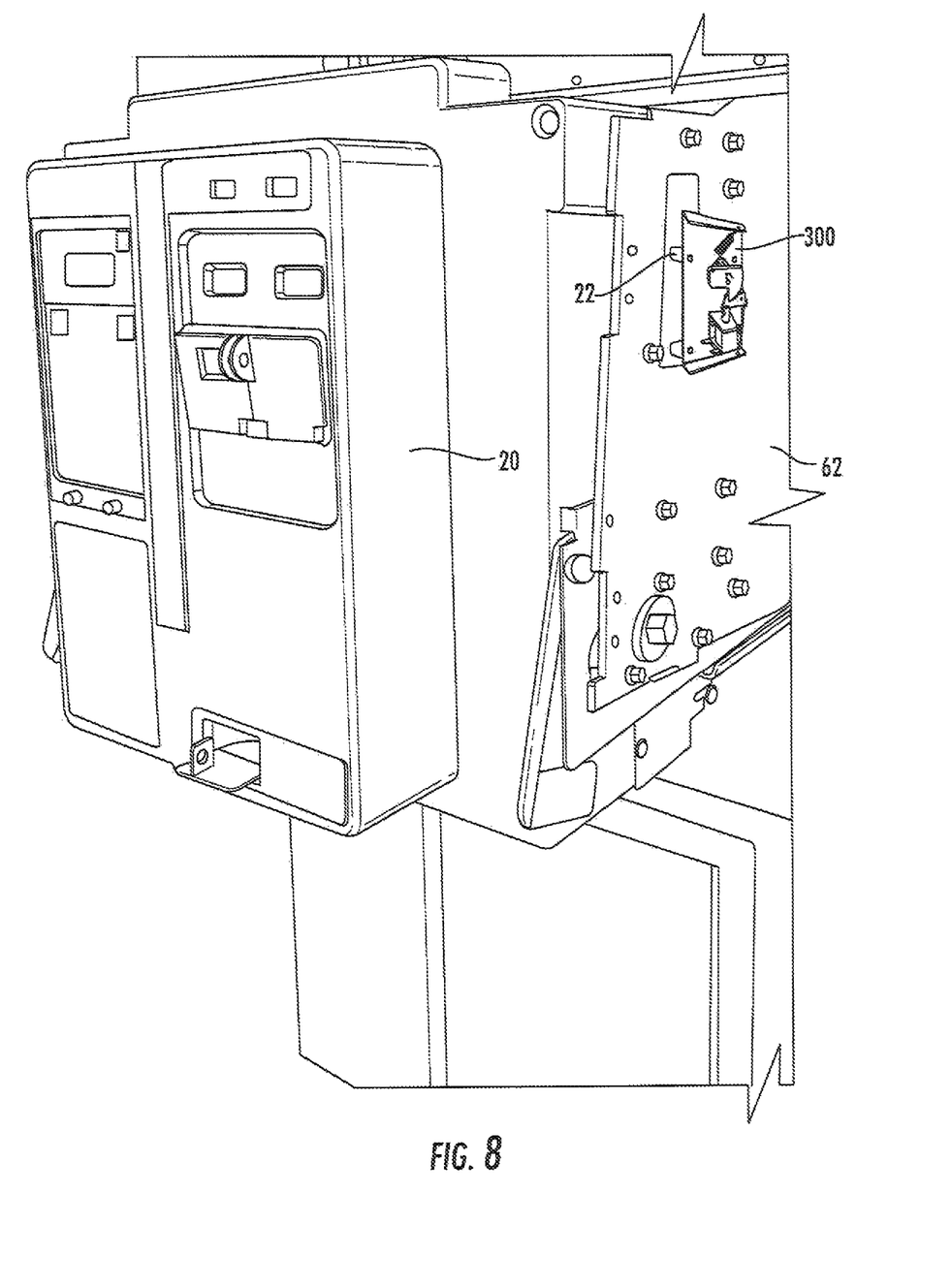
FIG. 8 is a perspective view of the circuit breaker and cassette of FIG. 7 in an inserted state showing a lockout actuator that engages the lockout member according to some embodiments.
Figure 9:
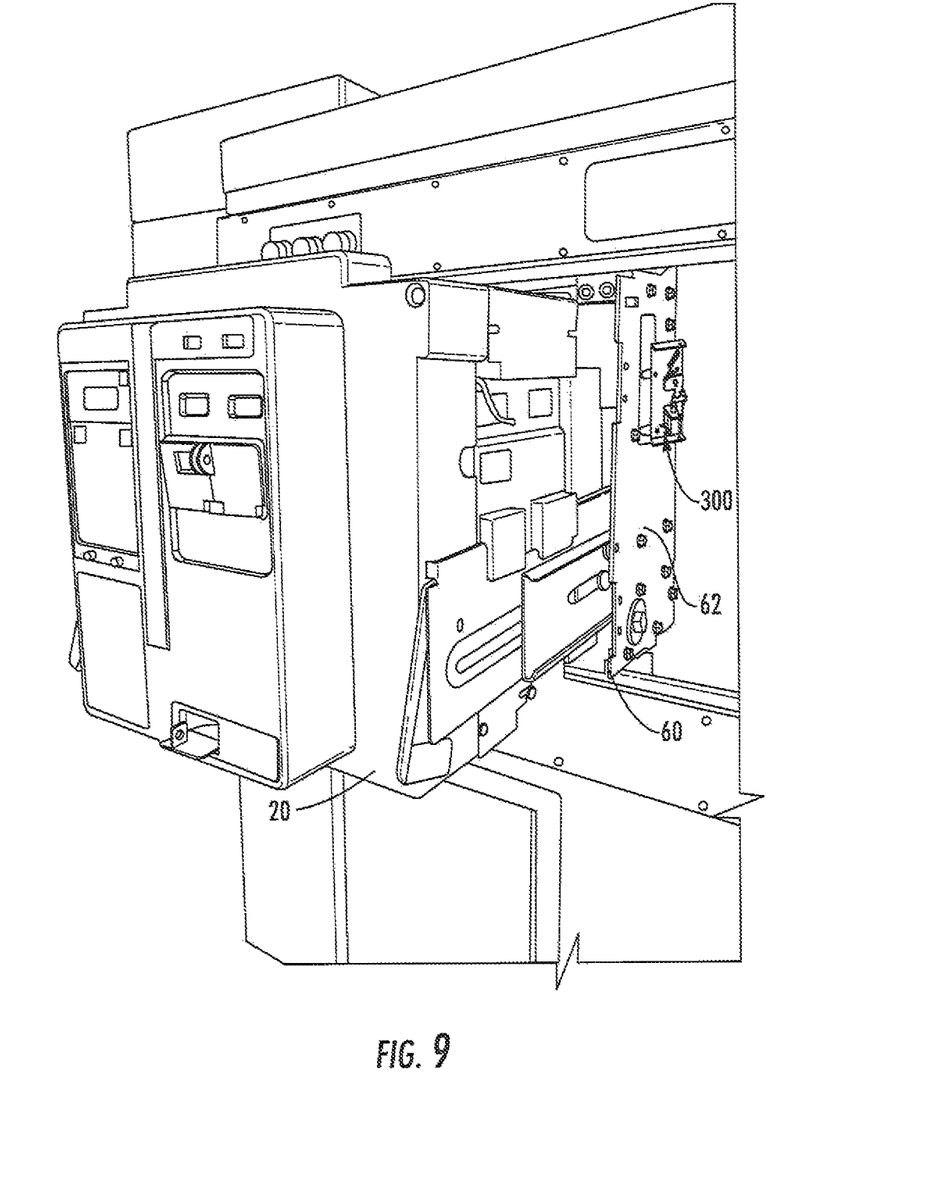
FIG. 9 is perspective view illustrating the circuit breaker and cassette of FIG. 6 in an extracted state.

FIG. 2 illustrates an exemplary implementation of such an interlock device. As shown, the arc quenching device 10 may include a set of auxiliary contacts 12 that close when the arc quenching device 10 has created a fault between phase conductors of the bus 30. The contacts 12 can be used to close, a circuit that connects a power source 50 to an actuator 200. In response to closing of the contacts 12, the actuator 200 actuates a lockout member 22 of the circuit breaker 20, thus locking the circuit breaker 20 to prevent closing the circuit breaker 20 into the fault created by the arc quenching device 10. FIGS. 6 and 7 illustrate a circuit breaker 20 with such a lockout member 22, wherein movement of the lockout member 22 towards the front of the breaker 20 prevents the breaker 20 from closing its main contacts after they have been tripped.

Figure 3:
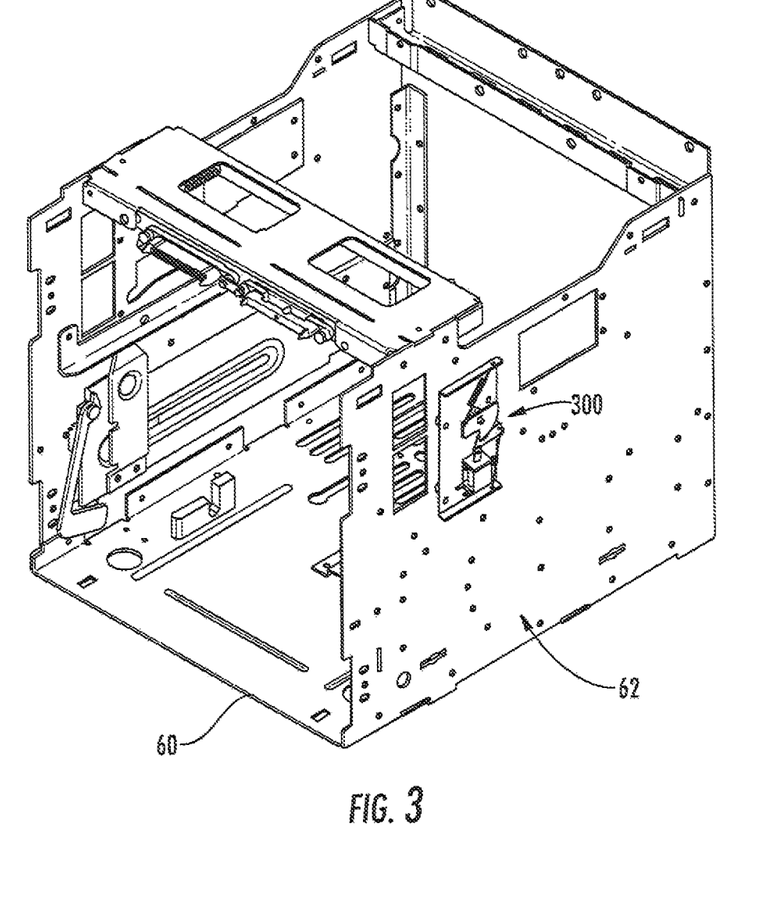
FIG. 3 is a perspective view of a cassette for a circuit breaker with circuit breaker lockout actuator according to some embodiments of the inventive subject matter.
Figure 4:
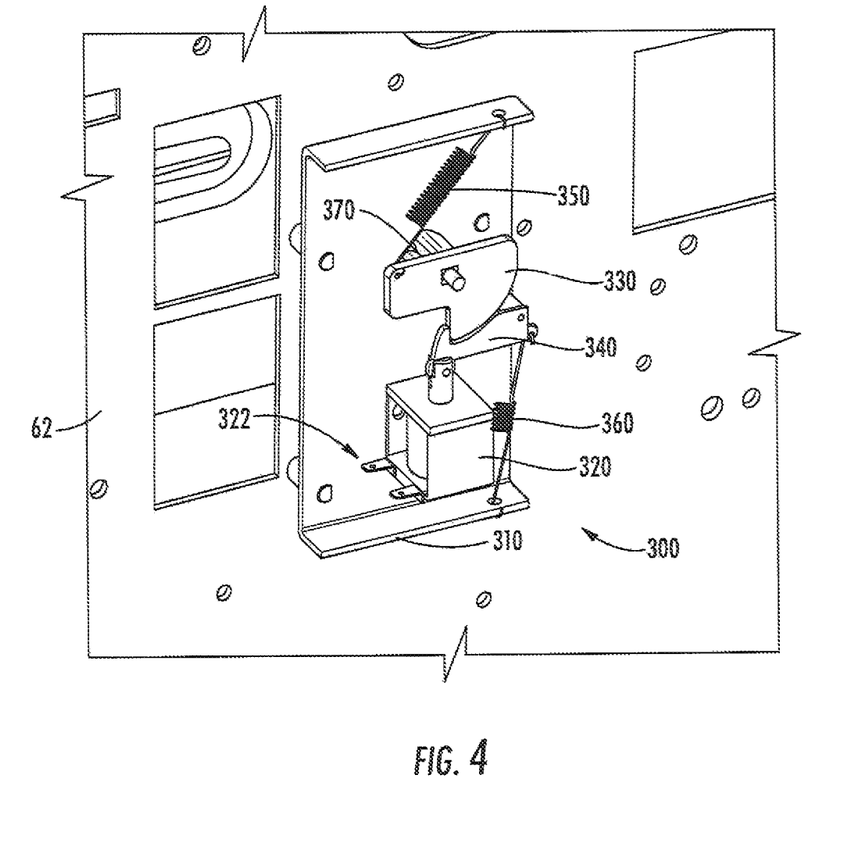
FIG. 4 is detailed perspective view of the lockout, actuator of FIG. 3.
Figure 5:
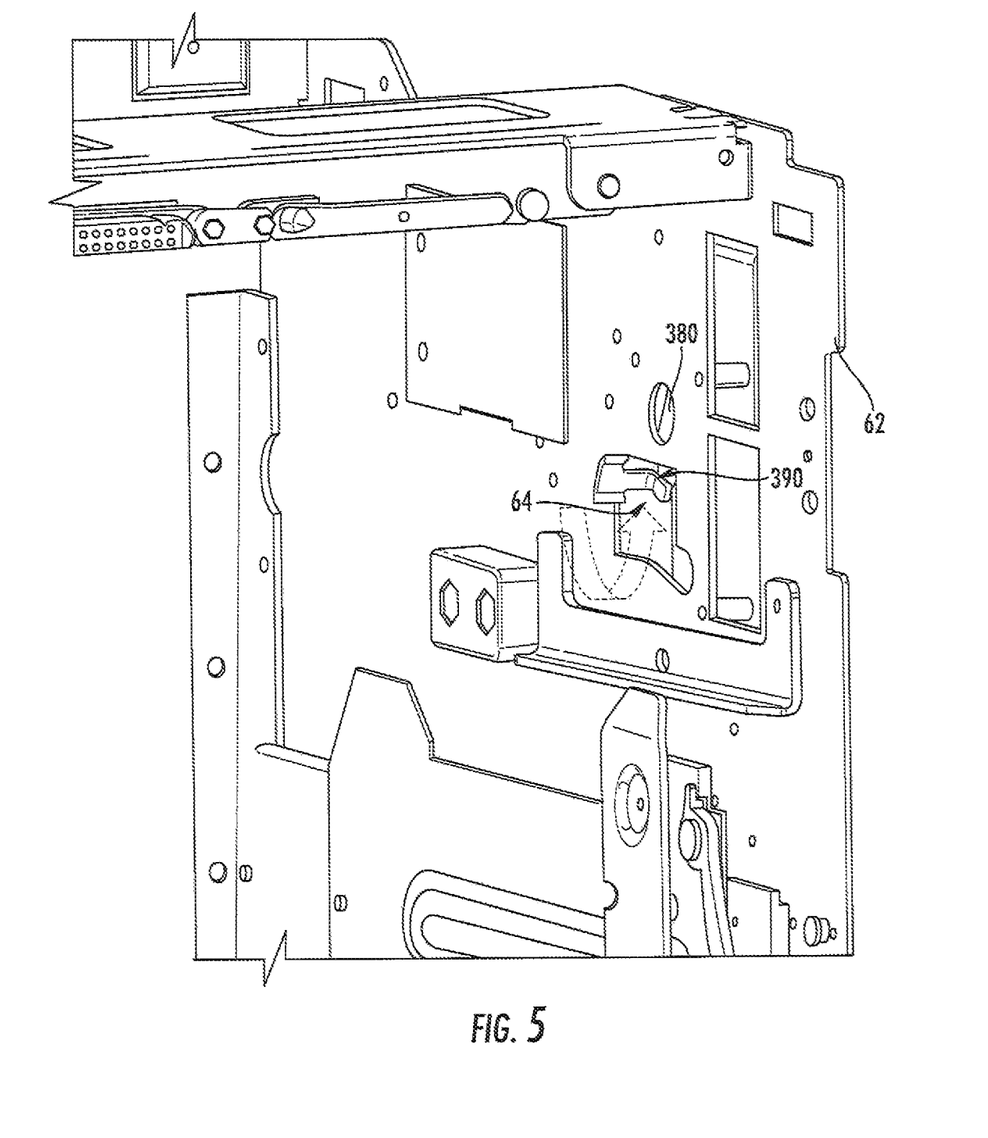
FIG. 5 is another detailed perspective of the lockout actuator of FIG. 3.

FIGS. 3-5 illustrate an exemplary implementation of an actuator 300 for actuating such a circuit breaker lockout member. The actuator 300 is, configured to be mounted on a sidewall 62 of a switchgear drawout cassette 60 that supports a circuit breaker, such as the circuit breaker 20 shown in FIGS. 6 and 7. As shown in FIG. 4, the electromechanical actuator 300 includes a frame 310 that supports a spring-loaded mechanism including a drive latch 330, a lock latch 340, a main drive spring 350, a return spring 360 and a main drive shaft 370.

Referring to FIG. 5, the main drive shaft 370 is linked by an arm 380 to a lockout engagement member 390 that passes through an opening 64 in the sidewall 62 and is configured to engage a lockout member (such as the lockout member 22 shown in FIGS. 6 and 7) of a circuit breaker mounted in the cassette 60. A solenoid 320 is attached to the lock latch 340 and has contacts 322 that are configured to be coupled to an auxiliary contact set of an arc quenching device, along the lines described above with reference to FIG. 2.

In an armed position, the lock latch 340 engages the drive latch 330 in a pawl/ratchet arrangement, loading the main drive spring 350. When the solenoid 320 actuates, the lock latch 340 is pulled downward, releasing the drive latch 330 to rotate in a clockwise direction under force applied by the main drive spring 350. This rotates the shaft 370 connected to the drive latch 330 in a clockwise direction, causing the lockout engagement member 390 to move the lockout member 22 towards the front of the circuit breaker 20 to lock out the circuit breaker 20. The mechanism can be reset by applying a counterclockwise force to the drive latch 340 with the solenoid 320 de-energized. When the drive latch 340 has rotated sufficiently, the return spring 360 causes the lock latch 340 to re-engage the drive latch 330, thus rearming the mechanism to await the next actuation of the solenoid 320. The return spring 360 may be omitted if the solenoid 320 is equipped with its own return spring that forces the solenoid shaft upwards toward the lock latch 340.

It will be appreciated that the embodiments described above are provided for purposes of illustration, and that some embodiments of the inventive subject matter may use other mechanical and/or electrical arrangements. For example, in applications that use a circuit breaker with a different lockout mechanism than the lever-type member 22 shown in FIGS. 6 and 7, an interlock mechanism according to some embodiments may use a different mechanism to actuate the circuit breaker lockout mechanism. In some embodiments, an arc quenching device may use circuitry other than auxiliary contacts along the lines of the contacts 12 shown in FIG. 2 to signal the state of the arc quenching device. An interlock device according to some embodiments may interface to this circuitry in a different manner than that described above with reference to FIG. 2. For example, such an interlock device may include digital and/or analog circuitry configured to receive a signal indicative of the state of the arc quenching device and to generate a drive current for a solenoid, motor or other actuator that actuates a lockout mechanism of a circuit breaker.

In the drawings and specification, there have been disclosed exemplary embodiments of the inventive subject matter, Although specific terms are employed, they are used in a generic and descriptive sense only and not for purposes of limitation, the scope of the inventive subject matter being defined by the following claims.

That which is claimed:

1. A system comprising:
    a circuit breaker coupled to a bus and having a lockout mechanism configured to prevent closing of the circuit breaker to feed energy to the bus;

an arc quenching device coupled to the bus and configured to create a fault on the bus; and an interlock device external to the circuit breaker and configured to mechanically actuate the lockout mechanism of the circuit breaker responsive to the arc quenching device.

2. The system of claim 1, wherein the circuit breaker is supported by a drawout cassette and wherein the interlock device is mounted on the cassette.

3. The system of claim 2, wherein the interlock device comprises:
   a spring-loaded mechanism mounted on the cassette and configured to engage a lockout member of the circuit breaker; and
   an actuator configured to release the spring-loaded mechanism to cause the spring-loaded mechanism to move the lockout member.

4. The system of claim 3, wherein the spring-loaded mechanism comprises:
   a lockout engagement member disposed on a first side of a sidewall of the cassette and configured to engage the lockout member;
   a shaft mechanically coupled to the lockout engagement member;
   a drive latch attached to the shaft on a second side of the sidewall and configured to rotate with the shaft;
   a drive spring attached to the drive latch; and
   a lock latch configured to engage the drive latch to prevent movement thereof,
   wherein the actuator is configured to move the lock latch to release the drive latch to rotate under a force applied by the drive spring.

5. The system of claim 4, wherein the arc quenching device comprises a set of auxiliary contacts, and wherein the actuator comprises a solenoid electrically coupled to a power source via the set of auxiliary contacts.

6. The system of claim 1, wherein the arc quenching device comprises a set of auxiliary contacts and wherein the interlock device is electrically coupled to the set of auxiliary contacts.

7. The system of claim 6, wherein the interlock device comprises:
   a spring-loaded mechanism configured to engage a lockout member of the circuit breaker; and
   a solenoid electrically coupled to the set of auxiliary contacts and configured to release the spring-loaded mechanism to move the lockout member.

8. The system of claim 1, wherein the circuit breaker is configured to open responsive to the fault, and wherein the interlock device is configured to prevent reclosing of the circuit breaker onto the bus after the arc quenching device generates the fault.

9. An interlock device comprising:
   a spring-loaded mechanism configured engage a lockout member of a circuit breaker; and
   an actuator configured to release the spring-loaded mechanism responsive to operation of an arc quenching device configured to create a fault on a bus fed by the circuit breaker to cause the spring-loaded mechanism to move the lockout member.

10. The device of claim 9, wherein the spring-loaded mechanism is configured to be mounted on a drawout cassette that holds the circuit breaker.

11. The device of claim 10, wherein the spring-loaded mechanism comprises:
   a lockout engagement member disposed on a first side of a sidewall of the cassette and configured to engage the lockout member;
   a shaft mechanically coupled to the lockout engagement member;
   a drive latch attached to the shaft on a second side of the sidewall and configured to rotate with the shaft;
   a drive spring attached to the drive latch; and
   a lock latch configured to engage the drive latch to prevent movement thereof,
   wherein the actuator is configured to move the lock latch to release the drive latch to rotate under a force applied by the drive spring.

12. The device of claim 11, wherein the actuator comprises a solenoid configured to be electrically coupled to a power source via a set of auxiliary contacts of the arc quenching device.

13. The device of claim 9, wherein the actuator comprises a solenoid configured to be electrically coupled to a power source via a set of auxiliary contacts of the arc quenching device.

14. The device of claim 9, wherein the actuator is configured to be electrically coupled to a power source via a set of auxiliary contacts of the arc quenching device.

15. A method comprising:
   creating a fault on a bus using an arc quenching device; and
   responsively mechanically actuating an externally-actuated lockout mechanism of a circuit breaker feeding the bus.

16. The method of claim 15, wherein mechanically actuating the lockout mechanism comprises releasing a spring-loaded mechanism mounted on a cassette that holds the circuit breaker to cause the mechanism to engage a lockout member of the circuit breaker.

17. The method of claim 16, wherein releasing the spring-loaded mechanism comprises driving an actuator that releases the spring-loaded mechanism responsive to a set of contacts controlled by the arc quenching device.

18. The method of claim 15, wherein mechanically actuating the lockout mechanism comprises actuating the lockout mechanism responsive to operation of a set of contacts controlled by the arc quenching device.

19. The method of claim 15, further comprising opening the circuit breaker responsive to the fault and wherein actuating the lockout mechanism of the circuit breaker prevents reclosing of the circuit breaker onto the bus after the arc quenching device generates the fault.

* * * * *

UNITED STATES PATENT AND TRADEMARK OFFICE
CERTIFICATE OF CORRECTION

| | |
|---|---|
| PATENT NO. | : 10,903,029 B2 |
| APPLICATION NO. | : 16/376826 |
| DATED | : January 26, 2021 |
| INVENTOR(S) | : Burns et al. |

It is certified that error appears in the above-identified patent and that said Letters Patent is hereby corrected as shown below:

On the Title Page (54) Title: Please correct title to read -- CIRCUIT BREAKER INTERLOCK FOR ARC QUENCHING DEVICE --

(73) Assignee: Please correct "Eaton Intelligent Power Limited" to read -- Eaton Intelligent Power Limited (IE) --

In the Specification

Column 1, Lines 1-2: Please correct title to read -- Circuit Breaker Interlock For Arc Quenching Device --

Signed and Sealed this
Fourteenth Day of June, 2022

Katherine Kelly Vidal
*Director of the United States Patent and Trademark Office*